(12) United States Patent
Kirman et al.

(10) Patent No.: US 12,521,018 B2
(45) Date of Patent: Jan. 13, 2026

(54) SYSTEMS, DEVICES, AND METHODS FOR IMAGE INTERPRETATION

(71) Applicant: MolecuLight Inc., Toronto (CA)

(72) Inventors: Jeffrey R. Kirman, Montreal (CA); Desmond Hirson, Toronto (CA)

(73) Assignee: MolecuLight Inc., Toronto (CA)

( * ) Notice: Subject to any disclaimer, the term of this patent is extended or adjusted under 35 U.S.C. 154(b) by 444 days.

(21) Appl. No.: 18/058,338

(22) Filed: Nov. 23, 2022

(65) Prior Publication Data

US 2023/0165469 A1 Jun. 1, 2023

Related U.S. Application Data

(60) Provisional application No. 63/282,894, filed on Nov. 24, 2021.

(51) Int. Cl.
*A61B 5/00* (2006.01)
*G06T 7/00* (2017.01)

(52) U.S. Cl.
CPC .......... *A61B 5/0071* (2013.01); *A61B 5/0077* (2013.01); *A61B 5/445* (2013.01);
(Continued)

(58) Field of Classification Search
CPC ... A61B 5/0064; A61B 5/0071; A61B 5/0077; A61B 5/441; A61B 5/445; G06T 7/0012; G06T 2207/10064; G06T 2207/20221
See application file for complete search history.

(56) References Cited

U.S. PATENT DOCUMENTS

| | | | | |
|---|---|---|---|---|
| 2016/0370367 A1* | 12/2016 | Garcia | ............... | G02B 21/0028 |
| 2017/0236281 A1* | 8/2017 | Dacosta | ............... | A61B 5/0071 |
| | | | | 382/128 |

FOREIGN PATENT DOCUMENTS

| WO | 2009140757 A1 | 11/2009 |
|---|---|---|
| WO | 2019148265 | 8/2019 |

(Continued)

OTHER PUBLICATIONS

International Search Report and Written Opinion dated Jan. 24, 2023 in related PCT Application No. PCT/CA2022/051720, 11 pages.

(Continued)

*Primary Examiner* — Carolyn A Pehlke
(74) *Attorney, Agent, or Firm* — Jones Robb, PLLC

(57) ABSTRACT

Systems, devices, and methods operate on a fluorescence image to ensure a white balance correctness of the fluorescence image; perform a color analysis of the fluorescence image, including: converting the fluorescence image to an HSV color space, comparing a saturation parameter of the first converted image to a first saturation threshold condition and comparing a value parameter of the first converted image to a first value threshold condition, wherein the first value and saturation threshold conditions are based on a correlation between a first color and the first bacterial fluorescence signature, and identifying areas of the fluorescence image where the saturation parameter satisfies the first saturation threshold condition and the first value parameter satisfies the value threshold condition, discard the identified areas which are smaller than a size threshold, and outline the remaining identified areas on the fluorescence image, thereby to generate an overlay image.

33 Claims, 8 Drawing Sheets

(52) U.S. Cl.
CPC ............ *A61B 5/743* (2013.01); *G06T 7/0012* (2013.01); *G06T 2207/10064* (2013.01); *G06T 2207/20221* (2013.01)

(56) References Cited

FOREIGN PATENT DOCUMENTS

| | | |
|---|---|---|
| WO | 2019148268 A1 | 8/2019 |
| WO | 20200148725 A1 | 7/2020 |
| WO | 20200148726 A1 | 7/2020 |
| WO | 2020156653 | 8/2020 |

OTHER PUBLICATIONS

European Search Report dated Sep. 9, 2025 received in EP Application No. 22896909.3.

\* cited by examiner

SYSTEMS, DEVICES, AND METHODS FOR IMAGE INTERPRETATION

CROSS-REFERENCE TO RELATED APPLICATIONS

The present Application claims priority to U.S. Provisional Application No. 63/282,894, filed in the United States Patent and Trademark Office on Nov. 24, 2021, the entire contents of which are herein incorporated by reference.

TECHNICAL FIELD

Systems, devices, and methods for image interpretation are disclosed. The images may be various types of images including fluorescence images. In particular, the systems, devices, and methods may utilize, interpret, and/or modify images obtained by an imaging system to identify or assist in the identification of characteristics of interest related to a target in the image. In various applications, for example, the target may be a wound and the systems, devices, and methods herein may be used to identify, quantify, and/or differentiate bacteria present in the wound.

BACKGROUND

Wound care is a major clinical challenge. Healing and chronic non-healing wounds are associated with a number of biological tissue changes including inflammation, necrosis, production of exudate, bleeding, proliferation, remodeling of connective tissues, and, a common major concern, bacterial presence, growth and infection. A portion of wound infections are not clinically apparent and contribute to the growing personal, emotional, and economic burdens associated with wound care, especially in aging populations. For example, *Pseudomonas aeruginosa* and *Staphyloccocus aureus* are genera of bacteria that are prevalent in hospital settings and are common causes of bacterial infection. Currently, the clinical gold standard of wound assessment includes direct visual inspection of the wound site under white light illumination for classical signs and symptoms of infection. This is often combined with a swab culture or tissue biopsy sample for laboratory testing.

Certain medical specialties (e.g., cardiology, oncology, neurology, orthopedics, etc.) rely on particular imaging modalities (e.g., x-ray, ultrasound, magnetic resonance imaging (MRI), computed tomography (CT) scans, etc.) to assist with the diagnosis and assessment. Clinicians in such specialties may use advanced and established methods of interpreting the images. In wound care specialties, by contrast, the standard of care has not historically relied on such imaging modalities and no such advanced or established methods of interpreting the images exist. While some clinicians may use cameras to capture images of a wound in a standard photographic format, these formats do not identify or expose any bacterial information within the wound.

Qualitative and subjective visual assessment only provides a gross view of the wound site, but does not provide information about underlying biological, biochemical, and molecular changes that are occurring at the tissue and cellular level. Moreover, bacteria are invisible to the unaided eye, resulting in suboptimal wound sampling and an inability to appropriately track changes in bacterial growth in the wound site. This can impede healing and timely selection of the optimum anti-microbial treatment. Moreover, it may be difficult to differentiate certain markers of bacterial presence from similar markers caused by non-bacterial sources. For example, a fluorescence image may contain reflections from non-bacterial sources (e.g., tattoos, fingernails, toenails, jewelry, background environment, etc.) which appear to be similar in color to the fluorescence that would be expected from certain strains of bacteria. These situations may result in the misidentification of a wound as containing bacteria when it does not (perhaps resulting in medically unnecessary treatments) and/or the misidentification of a wound as being free from bacteria when it is in fact infected (perhaps resulting in severe infection spread, decreased quality of life, digit loss, etc.).

Therefore, there exists a need for systems, devices, and methods for the analysis, interpretation, and/or modification of medical images (such as fluorescence images of wounds or skin) which may reliably indicate the presence and locations of regions which potentially have bacteria levels above a certain clinically important threshold, thus enabling better treatments and reducing both morbidity and mortality due especially to elevated bacterial burden associated with chronic wounds.

OVERVIEW

In view of these and other circumstances, the present disclosure provides for methods, systems, and devices to provide point-of-care interpretation of images to assist with the identification of regions of interest in the image. In one example, the methods, systems, and devices of the present disclosure assist with point-of-care interpretation of fluorescence images of tissues such as wounds, where the assistance identifies regions of bacteria in the image by highlighting such areas on the image to bring them to the user/clinician's attention.

In one aspect of the present disclosure, there is provided a portable, hand-held device comprising: an imaging device configured to receive a fluorescence image; a memory; and a processor configured to: perform a color analysis of the fluorescence image, including: converting the fluorescence image to an HSV color space, thereby to generate a first converted image, for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature, for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the first value parameter satisfies the value threshold condition, discard the identified areas which are smaller than a size threshold, and outline the remaining identified areas on the fluorescence image, thereby to generate an overlay image.

In another aspect of the present disclosure, there is provided a system, comprising: a display device; an imaging device including an excitation light source configured to irradiate a target area with excitation light, and an image sensor configured to capture a fluorescence image corresponding to a response of the target area to the excitation light; a housing; and circuitry disposed within the housing, including a processor configured to: perform a color analysis of the fluorescence image, including: converting the fluorescence image to an HSV color space, thereby to generate a first converted image, for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature, for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the first value parameter satisfies the value threshold condition, discard the identified areas which are smaller than a size threshold, and outline the remaining identified areas on the fluorescence image, thereby to generate an overlay image.

In yet another aspect of the present disclosure, there is provided a fluorescence image interpretation method, comprising: receiving a fluorescence image; performing a color analysis of the fluorescence image, including: converting the fluorescence image to an HSV color space, thereby to generate a first converted image, for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature, for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the first value parameter satisfies the value threshold condition; discarding the identified areas which are smaller than a size threshold; and outlining the remaining identified areas on the fluorescence image, thereby to generate an overlay image.

In yet another aspect of the present disclosure, there is provided a portable, hand-held device comprising: an imaging device configured to receive a fluorescence image; a memory; and a processor configured to perform a textural analysis of the fluorescence image, including: converting the fluorescence image to grayscale, thereby to generate a first converted image, comparing, on a pixel-by-pixel basis, an intensity parameter of the first converted image to an intensity threshold, temporarily identifying regions within a predetermined pixel distance of pixels in which the intensity parameter exceeds the intensity threshold, converting the fluorescence image to a predetermined color space, thereby to generate a second converted image, within each channel of the second converted image, determine a respective gradient of the temporarily identified regions, and permanently identifying those ones of the temporarily identified regions in which the respective gradient for each channel of the second converted image exceeds a gradient threshold.

In yet another aspect of the present disclosure, there is provided a method if interpreting a clinical image, comprising: on a handheld imaging device, receiving an input image; performing a color analysis and/or a textural analysis on the input image to identify areas of clinical interest in the input image; generating an overlay, wherein the overlay includes one or more colors, highlights, arrows or other manner of highlighting which, when positioned over the input image, provide an indication of one or more clinical features of interest; and displaying, in real-time, an output image comprising the input image and the overlay, wherein clinical features of interest on the input image are highlighted for a user of the imaging device by the overlay.

In yet another aspect of the present disclosure, there is provided a portable, hand-held device, comprising: an imaging device configured to receive an input image; a memory; and a processor configured to: perform a color analysis of the input image, including: convert the input image to a predetermined color space which includes a first channel corresponding to a first parameter, a second channel corresponding to a second parameter, and a third channel corresponding to a third parameter, thereby to generate a converted image, for a first range of the first parameter of the converted image, comparing the second parameter of the first converted image to a threshold condition, wherein the first threshold condition is based on a correlation between the first range of the first parameter and a bacterial signature, for the first range of the first parameter, comparing the third parameter of the converted image to a second threshold condition, wherein the second threshold condition is based on the correlation between the first range of the first parameter and the bacterial signature, and for the first range of the first parameter, identifying areas of the input image where the second parameter satisfies the first threshold condition and the third parameter satisfies the second threshold condition, discard the identified areas which are smaller than a size threshold, and outline the remaining identified areas of the input image, thereby to generate an overlay image.

In this manner, aspects of the present disclosure provide for improvements in at least the technical field of fluorescence imaging, as well as the related technical fields of image processing, medical devices, biophotonics, wound treatment, and the like. Additional aspects of the present disclosure will be set forth in part in the description which follows, and in part will be obvious from the description or may be learned by practice of the present disclosure. The aspects of the present disclosure, and advantages which arise therefrom, may be realized and attained by means of the elements and combinations particularly pointed out in the appended claims and their equivalents.

It is to be understood that both the foregoing general description and the following detailed description are exemplary and explanatory only and are not restrictive of the present disclosure and claims.

BRIEF DESCRIPTION OF THE DRAWINGS

These and other aspects of the present disclosure are described with respect to the attached drawings, in which.

DETAILED DESCRIPTION

Figure 1A:
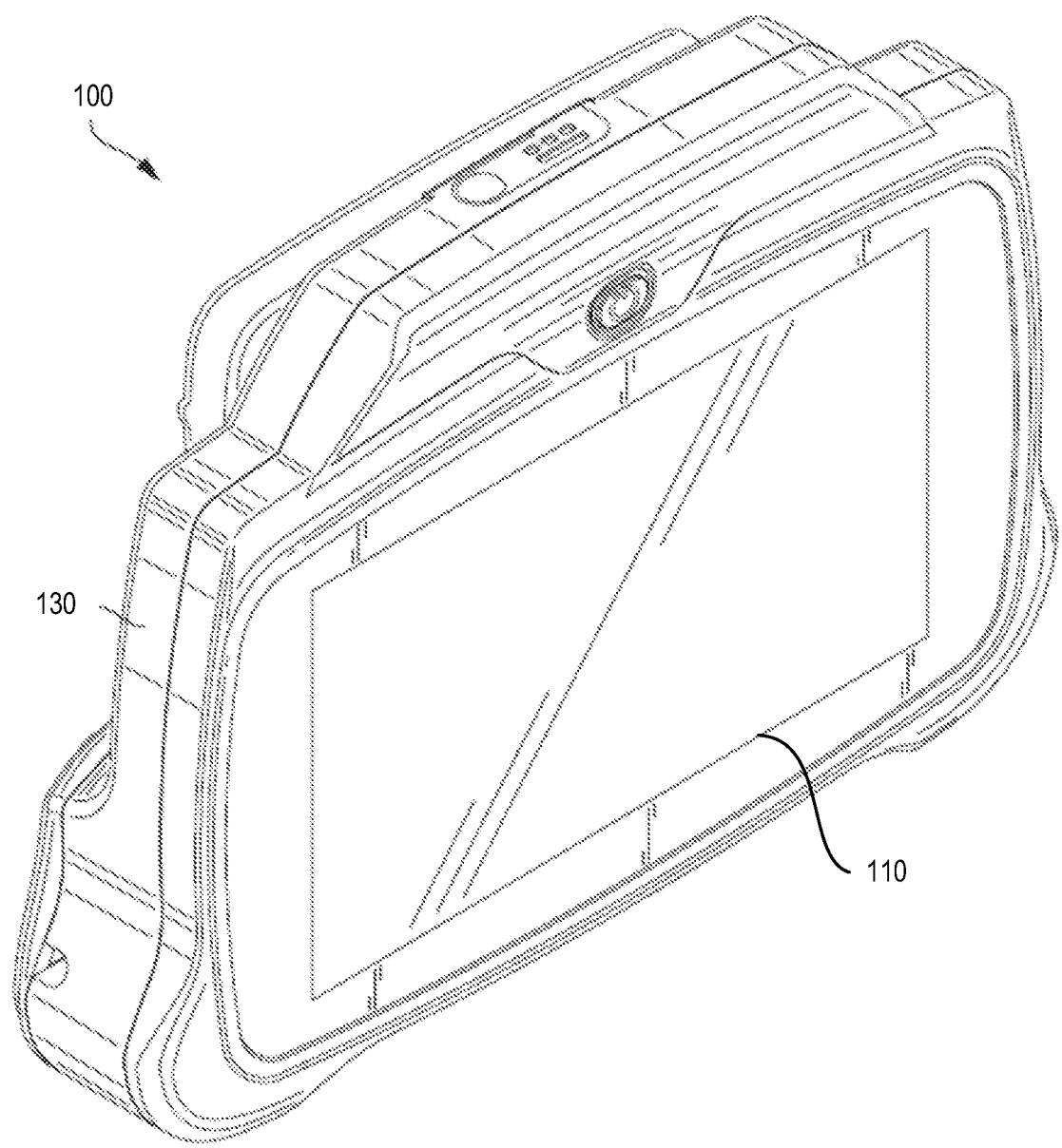
FIGS. 1A-B illustrate an exemplary device in accordance with various aspects of the present disclosure.

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure.

The present disclosure provides devices, systems, and computer-implemented methods which provide for automated image interpretation to provide guidance for a clinician reviewing the photos. For example, when a fluorescence image is captured and analyzed such that areas of bacterial fluorescence are identified and indicated on image by, for example, outlining the suspicious areas of infection. In some aspects, this is achieved by detecting shades of colors (e.g., red, yellow, and cyan colors) in the image that have shown to be indicative of bacteria. The image interpretation elements and operations analyze the image analyze the image for one or more bacterial fluorescence signals (e.g., for both red bacterial fluorescence signals and cyan bacterial fluorescence signals).

Although the present disclosure is described primarily with regard to identification of wound components and characteristics captured in fluorescent images, the devices, systems, and methods disclosed herein can also be used to identify characteristics of any target surface or object having a discernable color or texture profile that may be correlated to a condition and/or to the presence, location, and/or abundance of a microorganism such as bacteria. For example, the present disclosure may be used to identify characteristics of excised tissue, such as cancerous tissue (e.g., lumpectomy for best cancer surgery) captured in fluorescent, white light, or other images. In use with excised tissue, the devices and methods could be used to identify characteristics such as, for example, tissue components, tumor size, tumor edge, tumor boundaries, and tissue vascularization shown in fluorescent images. Moreover, while the present disclosure is described primarily with regard to certain wavelengths of fluorescence and corresponding or associated bacterial species, and so on, the present disclosure is not so limited. In practical implementations, the devices, systems, and methods herein may be recalibrated for any bacterial species based on a unique fluorescence emission signature of a given wavelength(s) or wavelength range(s) for the bacterial species, and similarly, can be used with other tissue components (normal or abnormal) for which a unique fluorescence signature is known. The present disclosure may additionally be implemented with regard to non-bacterial signatures, including but not limited to viruses, fungi, yeast, and/or other microorganisms. The devices, systems, and methods disclosed herein are not limited to use with fluorescence images, and instead may be used to analyze other types of images such as, for example, white-light images. The above recalibrations or additional implementations may be achieved by selecting particular thresholds depending on the particular implementation with little or no changes to the remainder of the methods, systems, and devices described herein.

Exemplary wound monitoring devices described herein including include hand-held/portable optical digital imaging devices having specific excitation light sources and optical band pass filters attached thereto. These devices include but are not limited to those described in International Patent Application Publication WO 2009/140757 A1, International Patent Application Publication WO 2019/148268 A1, International Patent Application Publication WO 2020/0148725 A1, and/or International Patent Application Publication WO 2020/0148726 A1, the entire contents of which are herein each incorporated by reference in their entirety. Using imaging devices and systems further described herein, fluorescence of components in a wound due to exposure to excitation light may be imaged and analyzed. For example, in a wound having a bacterial presence caused by or containing, for example, *Pseudomonas aeruginosa*, the *Pseudomonas aeruginosa* fluoresce with a specific spectral signature, i.e., one or more bands of wavelengths with known peaks, when subjected to excitation light. The excitation light may comprise any light with known wavelength or range of wavelengths with known peaks, such as a peak at 405 nm. Capturing and analyzing this data permits identification of bacterial presence in general, and identification of the presence, location, and/or abundance of specific types of bacteria as well. In order to identify, type, and quantify the bacterial presence as well as additional characteristics of the wound, the devices and systems are trained.

One example of a wound monitoring device is a portable, handheld imaging system that includes an imaging device having two or more cameras (i.e., camera sensors) and a processor coupled to the imaging device for analyzing the images captured from the camera sensors to perform algorithms or other operations as will be described in more detail below. The imaging device, for example, includes a first, primary camera sensor and a second, secondary camera sensor. The first, primary camera sensor and the second, secondary camera sensor may be configured to capture standard, white light (WL) images, fluorescent (FL) images, near infrared (NIR) images, or infrared (IR) images. The sensors may be so configured by use with dedicated filters or filters selectable from a plurality of filters associated with the imaging device (e.g., filter wheel, tunable filters, etc.). Thus, the method disclosed herein may be used to measure features captured in WL, FL, NIR, or IR images. In some implementations, to permit determination of the parallax value of a primary and secondary image (taken, respectively, by the primary and secondary camera sensors), the first camera sensor is separated from the second camera sensor by a predetermined, fixed separation distance.

Figure 1B:
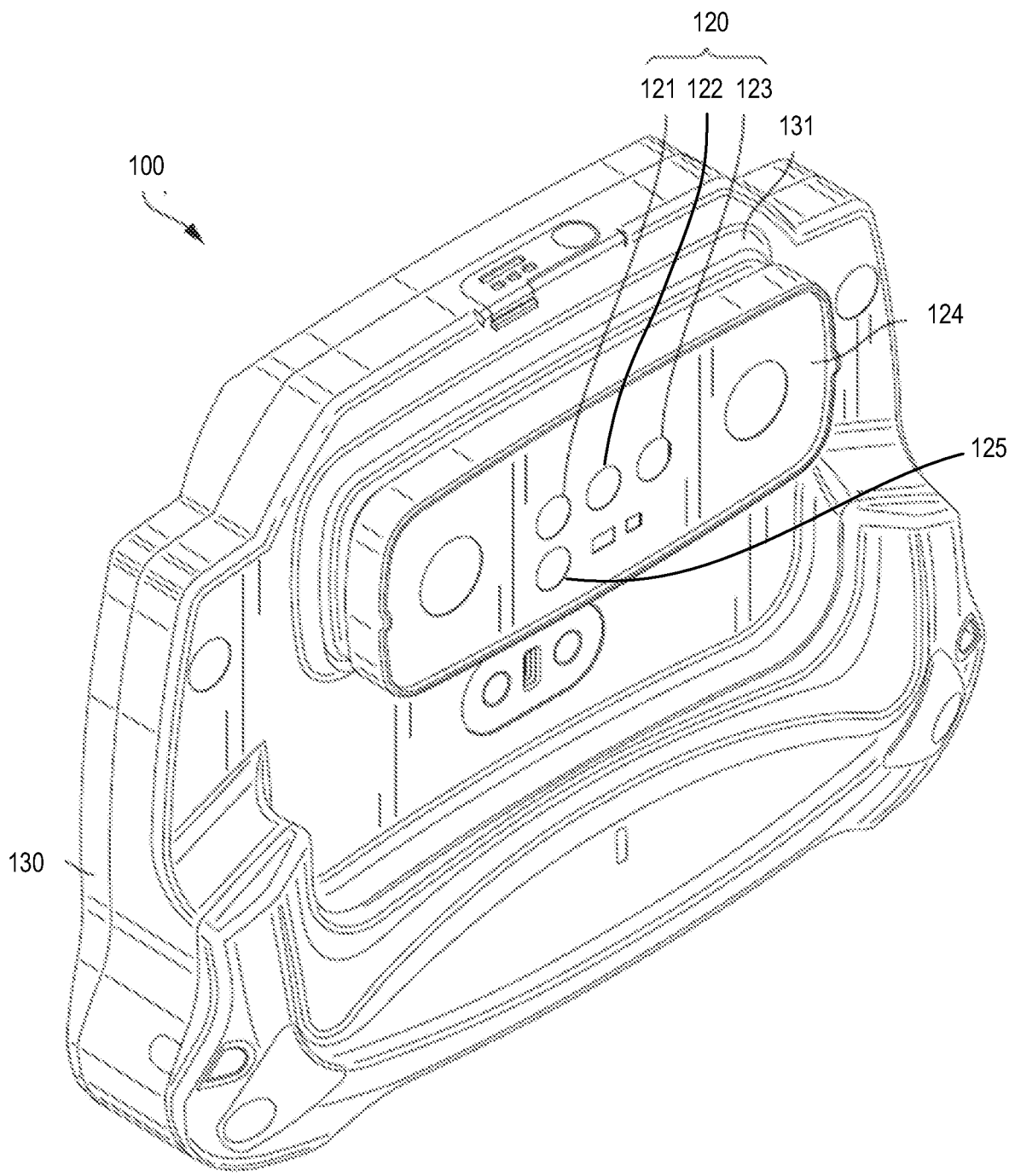

FIGS. 1A-B illustrate an exemplary wound monitoring device 100 in accordance with the present disclosure, in which FIG. 1A is a front perspective view of the wound monitoring device 100 and FIG. 1B is a rear perspective view of the wound monitoring device 100. Device 100 can be, for instance, the MolecuLight DX® device developed by MolecuLight®. Device 100 is non-contact and no imaging contrast agents are required for white light and/or fluorescence imaging. As illustrated, the wound monitoring device 100 includes a display device 110, and imaging device 120, and a housing 130.

Figure 2:
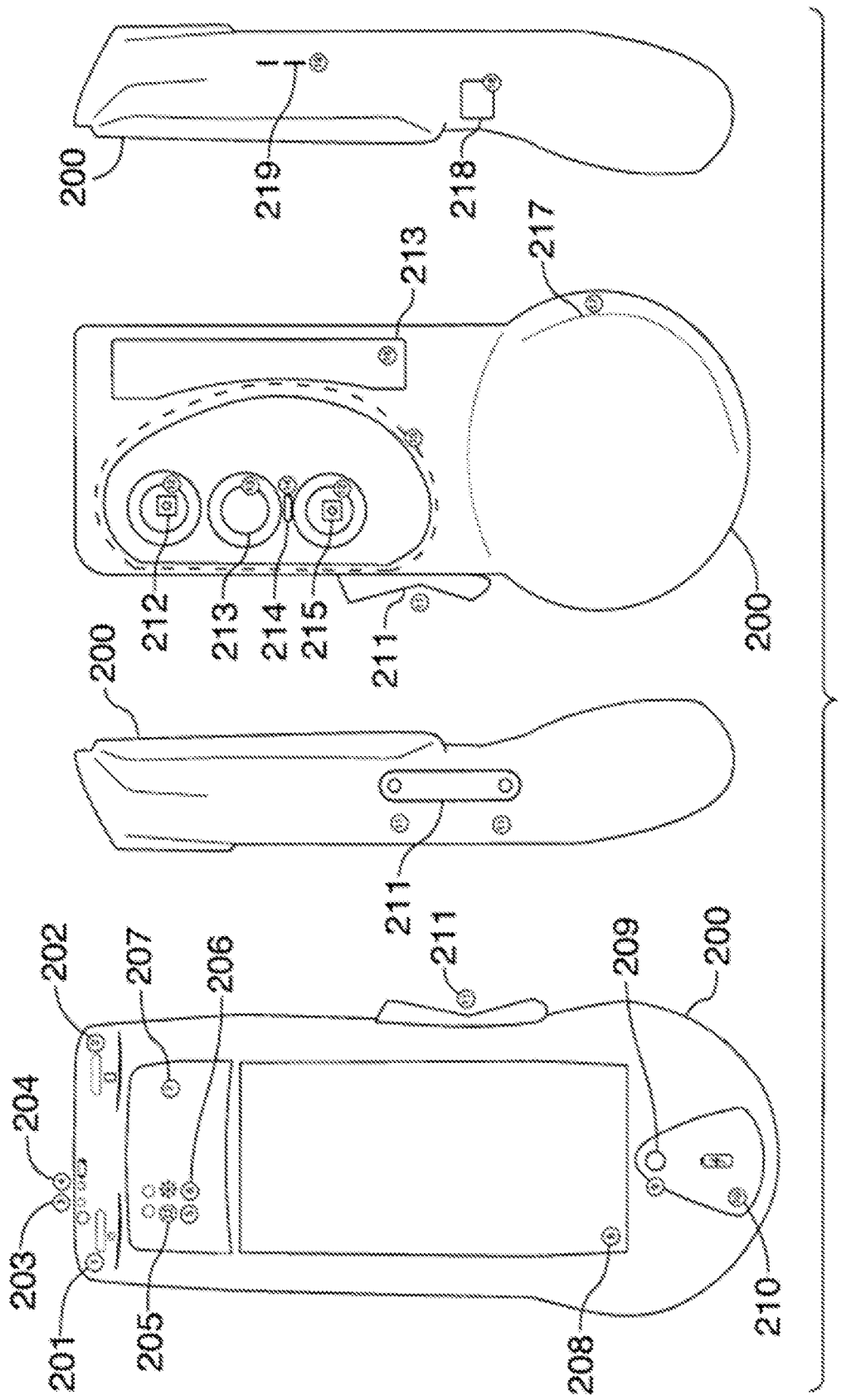
FIG. 2 illustrates another exemplary device in accordance with various aspects of the present disclosure.

The imaging device 120 includes at least one image sensor, such as, for example, a first image sensor 121, a second image sensor 122, and a third image sensor 123. Each of the first image sensor 121, the second image sensor 122, and the third image sensor 123 may individually be implemented as image sensors that may be used for one or more of WL, FL, IR, and thermal imaging. In one example, the first image sensor 121 and the third image sensor 123 are together configured for stereoscopic white-light imaging, and the second image sensor 122 is configured for fluorescence imaging. In another example, the first image sensor 121 and the third image sensor 123 are together configured for stereoscopic fluorescence imaging, and the second image sensor 122 is configured for white-light imaging. In yet another example, the first image sensor 121 is configured for white-light imaging, the second image sensor 122 is configured for fluorescence imaging of a first wavelength or wavelength range, and the third image sensor 123 is configured for fluorescence imaging of a second wavelength or wavelength range. The physical arrangement (i.e., ordering) of the first image sensor 121, the second image sensor 122, and the third image sensor 123 may also be different from that shown in FIG. 1B. Although for ease of illustration the wound monitoring device 100 depicts three image sensors, the present disclosure includes an imaging device 120 including any number of image sensors so long as at least one image sensor capable of receiving fluorescence signals is present. In the illustration of FIG. 2, the first image sensor 121, the second image sensor 122, and the third image sensor 123 are arranged in an optical battery 124. The optical battery 124 may further include one or more excitation light sources, such as excitation light source 125 implemented as a light-emitting diode (LED). The optical battery 124 may additionally include at least one white light torch, rangefinder, temperature sensor, etc.

The housing 130 may include a physical user interface, such as a power button, one or more input buttons, and so on. The housing 130 may also include various input and output ports, such as wired charging ports, inductive charging ports, universal serial bus (USB) ports, and/or other peripheral ports. As shown in FIG. 1B, the housing 130 includes an optical mount 131 on which the imaging device 120 is mounted. The optical mount 131 may provide for a permanent physical mount or may provide for a removable mount in implementations where the imaging device 120 is modular (i.e., may be replaced with other imaging devices such as endoscope heads). The housing 130 may be of a unitary construction or may include multiple housing components attached together. While not particularly illustrated in FIGS. 1A-B, the housing 130 may include an internal space in which various components such as a processor (e.g., a central processing unit (CPU)), a memory, a program storage, and the like are disposed.

FIG. 2 illustrates four views (front, right side, rear, and left side elevational views) of another exemplary wound monitoring device 200 in accordance with the present disclosure. Device 200 can be, for instance, the MoleculLight i:X® device developed by MoleculLight®. Device 200 allows clinicians to quickly, safely, and easily visualize bacterial presence and distribution in skin and wounds, in real-time including but not limited to the point-of-care. Device 200 is non-contact and no imaging contrast agents are required for white light and/or fluorescence imaging. Device 200 is depicted as a handheld portable medical device comprised of a high-resolution color LCD display and touch-sensitive screen 208 with integrated optical and microelectronic components and internal battery power source. Device 200 further includes a power button 201 for turning the device on and off, a display screen power button 202 for turning display screen 208 on and off, a system status LED 203 indicating overall device performance, a battery status LED 204 indicating device battery charge, a range finder LED system 205 indicating an optimal distance from the wound being targeted or imaged, an ambient light status LED 206 for indicating an optimal lighting environment for fluorescence mode imaging, a heat sink 207 for dissipating heat as device 200 may get warm after prolonged use, a home button 209 for providing access to image and video capture functions of device 200, and a port 210 for charging and data transfer. Port 210 may be used with any universal or proprietary cable, such as USB, or a MoleculLight i:X® connecting cable.

Device 200 further includes a rocker switch 211 enabling switching between a standard imaging mode and a fluorescence imaging mode. For instance, device 200 captures real-time images (e.g., in JPG format), and videos (e.g., in MOV format) using both standard and fluorescent imaging modes. The standard imaging mode is generally used for standard photography, i.e., to capture RGB images and videos of targets illuminated with standard white light. The fluorescence imaging mode is used to capture RGB images and videos of targets illuminated with light having known peak wavelengths and intended to generate fluorescence from specific targets being excited by the light. Consequently, device 200 further includes LEDs 212 that have specific wavelengths or ranges of wavelengths for illuminating targets when in fluorescence imaging mode, as well as a camera lens 213 enabling image and video capture, a range finder sensor 214 for detecting an optimal distance from a wound or surrounding skin, and an ambient light sensor 215 for detecting optimal lighting conditions for the fluorescence imaging mode. Further, device 200 includes a holding contour 217 for allowing a user to grip the device securely, and a charging port 218 enabling device charging using a standard or proprietary power adapter.

Figure 3:
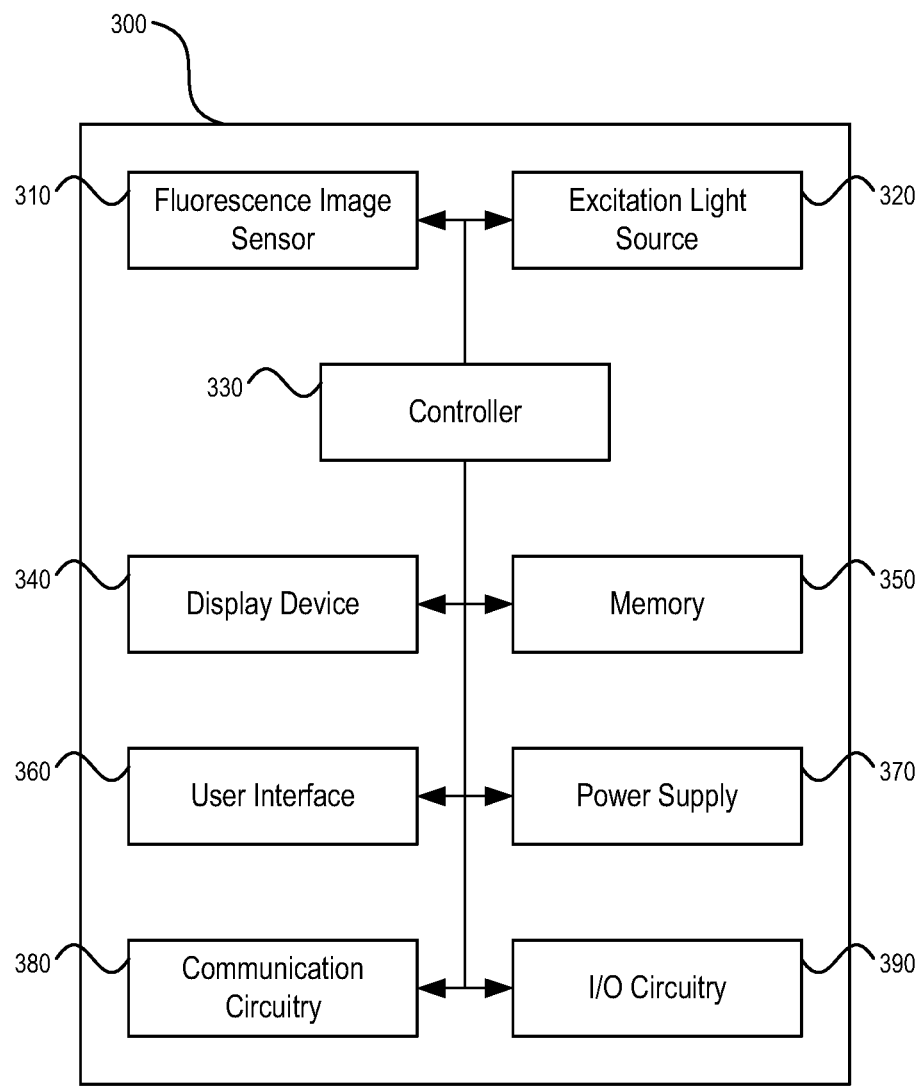
FIG. 3 illustrates an exemplary schematic of a device in accordance with various aspects of the present disclosure.

FIG. 3 illustrates an exemplary schematic of a wound monitoring device 300 in accordance with the present disclosure, which may be the same as or similar to the devices 100 or 200 illustrated in FIGS. 1-2, or a different device. As illustrated in FIG. 3, the wound monitoring device 300 includes a fluorescence image sensor 310, an excitation light source 320, a controller 330, a display device 340, a memory 350, a user interface (UI) 360, a power supply 370, communication circuitry 380, and input/output (I/O) circuitry 390.

The fluorescence image sensor 310 may be implemented as or including a photoelectric conversion device which receives incident electromagnetic radiation (e.g., light) and converts the radiation into signal charges which may be used to generate an image of the field-of-view of the image sensor. Such an image sensor may have, for example, a complementary metal-oxide semiconductor (CMOS) architecture, a charge-coupled device (CCD) architecture, and so on. The photoelectric conversion device may include an array of a plurality of individual pixel circuits, each of which includes a photosensitive element such as a photodiode. The image sensor may include additional circuitry such as driving circuits, timing circuits, memory circuits, control circuits, output circuits, power circuits, buses, and the like.

The fluorescence image sensor 310 may include a filter or a plurality of filters to block certain wavelengths of light while permitting other wavelengths of light to pass therethrough to the fluorescence image sensor 310. In implementations where a plurality of filters is present, the filters may be disposed on a device which allows individual filters to be individually selected and moved in front of the fluorescence image sensor 310 (e.g., a filter wheel) to selectively detect specific optical signals based on the wavelength of light. The fluorescence image sensor 310 may be part of a digital camera, for example having at least an ISO800 sensitivity, but more preferably an ISO3200 sensitivity, and may be combined with one or more optical emission filters, or other equally effective (e.g., miniaturized) mechanized spectral filtering mechanisms (e.g., acousto-optical tunable filter or liquid crystal tunable filter). Each optical filter may have different discrete spectral bandwidths and may be band-pass, multi-band, short-pass, or long-pass filters. In one example, the fluorescence image sensor 310 includes a first filter having a passband of 600-660 nm and a second filter having a passband of 470-520 nm or 500-550 nm. The fluorescence image sensor 310 may include a lens, which may be aligned to point at a target area (e.g., an area being imaged), and can detect the optical signal that emanates from the target area or surface.

The excitation light source 320 may be or include one or more light emitting elements that produce excitation light or illumination, for example, monochromatic or white light having a wavelength peak of 400-450 nm, or any other combination of single or multiple wavelengths (e.g., wavelengths in the ultraviolet/visible/near infrared/infrared ranges), to illuminate a target object (e.g., a wound or other area of interest) in order to elicit an optical signal (e.g., fluorescence). For example, the excitation light source 320 may be blue or violet LED arrays emitting light at about 405 nm (e.g., ±5 nm), and may be coupled with additional band-pass filters centered at about 405 nm to remove/minimize the side spectral bands of light from the LED array output so as not to cause light leakage into the imaging detector with its own optical filters. The excitation light source 320 may further or alternatively comprise a laser diode and/or filtered lights arranged in a variety of geometries. The device 300 may include a method or apparatus (e.g., a heatsink or a cooling fan) to dissipate heat and cool the excitation light source 320. The device 300 may include a system or device (e.g., an optical band-pass filter) to remove any undesirable wavelengths of light from the excitation light source 320 used to illuminate the object being imaged.

The controller 330 may be an electronic processor, such as one or more computer processors (processing units), microprocessors, digital signal processors, controllers and microcontrollers, etc. Logic may be formed from signals stored on a computer-readable medium such as memory 350 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

The display device 340 may be any type of display, including but not limited to a liquid crystal display (LCD), a quantum dot display, an organic light emitting display (OLED), a thin-film transistor (TFT) display, and the like. The display device 340 may be configured to provide real-time display of the field-of-view of the fluorescence image sensor 310, to display images stored in memory 350 or remotely stored, to provide graphical overlays, and so on. The display device 340 may include a touch panel to permit input from a clinician as a user interface. The display device 340 may be configured to present one or more graphical user interfaces (GUIs).

The UI 360 may include physical and virtual mechanisms by which a user interacts with the device 300, including physical buttons, dials, switches, and the like; interactive icons displayed on the display device 340; and/or one or more GUIs. The power supply 370 may be an AC/DC power supply, a compact battery bank, or a rechargeable battery pack. Additionally or alternatively, the device 300 may be adapted for connecting to an external power supply. The communication circuitry 380 may include wired communication circuitry and/or wireless communication circuitry to permit communications between the device 300 and external devices. The communication circuitry 380 may be configured to communicate using wired communication media such as coaxial cables, USB cables, Ethernet cables, and so on; and/or using wireless communication protocols such as Wi-Fi, Bluetooth, Near Field Communication (NFC), 4G cellular communications, 5G wireless communications, and so on.

The I/O circuitry 390 may be or include on or more of: an interface for a head-mounted display; an interface for an external printer; an interface for a tablet computer, laptop computer, desk top computer or other computer device; an interface for a device allowing the use of extra memory; and an interface for a microphone. The device 300 may have a housing that houses all the components in one entity. The housing may be equipped with a means of securing any digital imaging device within it. The housing may be designed to be hand-held, compact, and/or portable. The housing may be one or more enclosures or separate housings.

The device 300 may be configured with application programs (e.g., stored in the memory 350 and loaded by the controller 330 for execution) to perform various algorithms, including those to provide image interpretation for fluorescence images. For example, the processor may be configured to "interpret" a fluorescent image by analyzing, for example, the hue, saturation, and value of colors present in the fluorescent image and identifying, based on the analysis, areas of the image that correspond to one or more areas of bacterial presence, where the bacterial presence and/or abundance exceeds a certain quantitative threshold or a specific type of bacteria that may be based on a spectral signature. The analysis may comprise, for example, comparing the HSV parameters of the image to threshold parameters, where the thresholds are set to remove pixels that may or may not be suspicious or contain a threshold quantity of bacteria. The processor may then create an overlay placed on the original image to highlight these areas of the original image and indicate that a clinician should consider these areas suspicious (e.g., as containing a certain level of bacteria and/or a certain type of bacteria) or consider for physical follow up such as debridement or swabbing.

In cases where a color analysis alone may not be sufficient to identify particular areas of interest in the fluorescent image, a texture analysis of the image may also be performed, as described below. This analysis may be performed in parallel or in series with the color analysis. For example, the texture analysis may be helpful in identifying areas of an image in which a bacterial signature of interest includes a non-primary color such as cyan or blush (pink). This analysis, in combination with the color analysis, allows the processor to identify specific areas indicative of a particular bacterial fluorescence signature in the fluorescent image.

In this manner, the devices and methods of the present disclosure aid a clinician in interpreting a fluorescent image of a wound.

In accordance with one example embodiment, the processor 330 may be configured to perform a color analysis of the fluorescence image, including: converting the fluorescence image to an HSV color space to generate a first converted image, comparing a saturation parameter of the first converted image to a first saturation threshold condition, wherein the first saturation threshold condition is based on a correlation between the first color and a first bacterial fluorescence signature, comparing a value parameter of the first converted image to a first value threshold condition, wherein the first value threshold condition is based on the correlation between the first color and the first bacterial fluorescence signature, and identifying (e.g., by flagging corresponding data) areas of the fluorescence image where the saturation parameter satisfies the first saturation threshold condition and the first value parameter satisfies the value threshold condition; discarding the identified areas (e.g., by unflagging the data corresponding to flagged areas) which are smaller than a size threshold, and outline the remaining identified areas on the fluorescence image, thereby to generate an overlay image. The color analysis may be repeated for multiple colors, each having their own saturation threshold conditions and/or value threshold conditions based on the correlations between the individual color and different bacterial fluorescence signatures. In other examples of the present disclosure, a color space other than HSV may be used in the color analysis, including but not limited to HSL, CIEXYZ, CIELUV, L*a*b*, RGB, YCbCr, YUV, LCh, CMY, CMYK, and custom color spaces. Where color spaces other than HSV are used, the threshold conditions (e.g., the hue thresholds, the saturation thresholds, and/or the value thresholds) may be converted to the other color spaces directly. Where the color space used in the color analysis is the same as the color space in which the input image has been captures (e.g., both RGB), then the conversion operation may be omitted.

The processor 330 may be configured to perform a textural analysis of the fluorescence image, including: converting the fluorescence image to grayscale to generate a second converted image; comparing, on a pixel-by-pixel basis, an intensity parameter of the second converted image to an intensity threshold; temporarily identifying regions within a predetermined pixel distance of pixels in which the intensity parameter exceeds the intensity threshold; converting the fluorescence image to a L*a*b* color space, thereby to generate a third converted image; within each channel of the third converted image, determine a respective gradient of the temporarily identified regions; and permanently identifying those ones of the temporarily identified regions in which the respective gradient for each channel of the third converted image exceeds a gradient threshold. In other examples of the present disclosure, a color space other than L*a*b* may be used in the textural analysis, including but not limited to HSV, CIEXYZ, CIELUV, RGB, YCbCr, YUV, LCh, CMY, CMYK, and custom color spaces. Where color spaces other than L*a*b* are used, the thresholds (e.g., the intensity thresholds and/or the gradient thresholds) may be selected and/or generated anew based on the characteristics of the other color spaces. Where color spaces other than HSV are used, the threshold conditions (e.g., the hue thresholds, the saturation thresholds, and/or the value thresholds) may be converted to the other color spaces directly. Where the color space used in the textural analysis is the same as the color space in which the input image has been captures (e.g., both RGB), then the conversion operation may be omitted. Where the color space used in the textural analysis is the same as the color space used in the color analysis, then one of the conversion operations may be omitted and/or the two conversion operations may be combined (depending on the order in which the color analysis and the textural analysis occur and/or whether the analyses are conducted in series or parallel).

The textural analysis may be used to differentiate between bacterial sources of apparent fluorescence and non-bacterial sources of apparent fluorescence (e.g., bone, tendon, tattoo ink, and so on). The analysis may be used to identify individual bacterial signature that correspond to a bacterial concentration of, for example, $10^4$ colony-forming-units per gram (cfu/g) or higher and may indicate the presence of any one of the following Gram Negative Aerobic Species
    *Pseudomonas aeruginosa*
    *Escherichia coli*
    *Proteus mirabilis*
    *Proteus vulgaris*
    *Enterobacter cloacae*
    *Serratia marcescens*
    *Acinetobacter baumannii*
    *Klebsiella pneumoniae*
    *Klebsiella oxytoca*
    *Morganella morganii*
    *Stenotrophomonas maltophilia*
    *Citrobacter koseri*
    *Citrobacter freundii*
    *Aeromonas hydrophilia*
    *Alcaligenes faecalis*
    *Pseudomonas putida*
Gram Positive Aerobic Species
    *Staphylococcus aureus*
    *Staphylococcus epidermis*
    *Staphylococcus lugdunensis*
    *Staphylococcus capitis*
    *Corynebacterium striatum*
    *Bacillus cereus*
    *Listeria monocytogenes*
Anaerobic Species
    *Bacteroides fragilis*
    *Clostridium perfringens*
    *Peptostreptococcus anaerobius*
    *Propionibacterium acnes*
    *Veillonella parvula*

The list above is intended to be non-limiting and exemplary only and does not encompass all species to which the devices and methods of present disclosure may be applied. In addition to identifying, for example, bacteria present in concentrations equal to or greater than $10^4$ cfu/g, the image analysis of the present disclosure may be used to identify other characteristics that clinicians may find useful or relevant to a diagnosis, so long as there is some perceivable difference for a specific color, intensity, or texture feature in an image which may form the basis for selecting one or more thresholds.

Figure 4A:
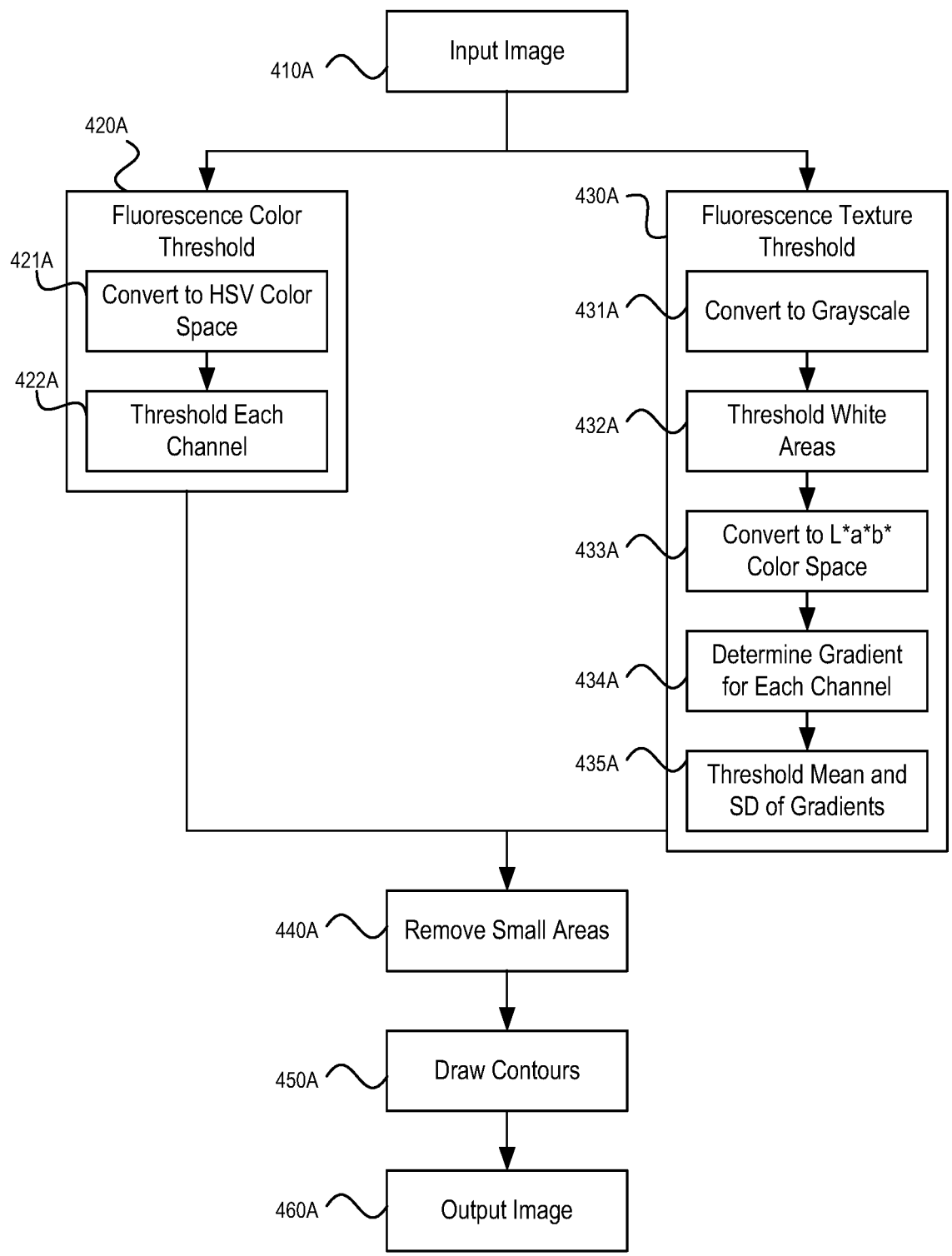
FIGS. 4A and 4B illustrate exemplary process flows in accordance with various aspects of the present disclosure.

FIG. 4A illustrates one example of operations in accordance with the present disclosure. The operations of FIG. 4A include color and textural threshold analyses and may be performed for a single color. The operations include, at 410A, receiving an input image. The input image may be a still image retrieved from a memory or captured by an image sensor, a video image retrieved from a memory and/or captured by the image sensor, and/or a real-time video stream from the image sensor. The input image may be a fluorescence image capturing that captured the response of a target area (e.g., a wound) exposed to an excitation light. FIG. 4A illustrates two thresholding operations being performed in parallel for a target color: operation 420A of performing a fluorescence color thresholding, and operation 430A of performing a fluorescence texture threshold. Operations 420A and 430A are not limited to being performed in parallel and may be performed serially in any order. For some implementations (e.g., for particular colors), only operation 420A or only operation 430A may be performed. The color and/or textural threshold analyses of FIG. 4A may be performed for multiple colors in series or in parallel. For example, operation 420A only may be performed for a first color, and then operations 420A and 420A may both be performed for a second color, and so on.

Operation 420A includes an operation 421A of converting the input image (which may be captured in, for example, a red-green-blue (RGB) color space) to an HSV color space, thereby generating a converted image. The HSV color space includes three channels: hue (H), saturation (S), and value (V). The H parameter is expressed in degrees from 0° to 360°, and the S and V parameters are expressed as percentages from 0% to 100%. To convert from RGB color space to HSV color space, for example, a conversion algorithm may be applied to the input image on a pixel-by-pixel basis. This conversion algorithm may include normalizing each of the R, G, and B pixel values to 1; calculating hue using a formula that is dependent on whether the normalized R, G, or B parameter is largest; calculating saturation based on the difference between the largest normalized R, G, and B parameter and the smallest and based on the value of the largest normalized R, G, and B parameter; and calculating value based on the largest normalized R, G, and B parameter.

Operation 420A includes operation 422A of comparing each of the H, S, and V channels of the converted image to a threshold condition. Pixels which satisfy the threshold condition for each of the channels may be identified as candidate pixel. In the example below, pixels which may not be "true" color pixels are eliminated by thresholding. This may be done, for example, to identify pixels that correspond to bacteria having a certain concentration or to limit to pixels that correspond to a particular species of bacteria. The thresholding operation may be performed for all pixels for each channel in succession (i.e., all pixels for H, all pixels for S, and then all pixels for V) or for all channels for each pixel in succession (i.e., H, S, and V for the upper-left pixel, followed by H, S, and V for the right-adjacent pixel, and so on). In one example of operation 422A, the hue threshold condition may be that pixels having an H parameter of within 20° of a target color are considered "color-candidate" pixels; the saturation threshold condition may be that pixels having an S parameter of greater than 75% are considered "color-candidate" pixels; and the value threshold condition may be that pixels having a V parameter of greater than 75% are considered "color-candidate" pixels. Operation 422A may also include identifying (e.g., by appending or updating a data flag) areas of the converted image (or the original fluorescence image) where each channel satisfies the corresponding threshold condition. Thus, pixels which are color-candidate in each of the three channels may be considered "target-color" pixels.

Operation 430A includes an operation 431A of converting the input image to grayscale, thereby generating a converted image. To convert from RGB color space to grayscale, for example, a conversion algorithm may be applied to the input image on a pixel-by-pixel basis. This conversion algorithm may include determining a simple average of the R, G, and B components, a weighted average of the R, G, and B, components, and so on. The converted grayscale image may thus represent a luminosity or intensity of the input image without regard to color. After operation 431A, at 432A the converted grayscale image may be compared to an intensity threshold on a pixel-by-pixel basis. Those pixels which correspond to an intensity greater than the intensity threshold may be temporarily identified (e.g., identified until operation 430A has concluded) as "texture-candidate" pixels. In some implementations, all pixels within a predetermined number of the temporarily-identified pixels may be temporarily identified as well, thereby to generate "texture-candidate" pixel regions.

At operation 433A, the input image is converted to a L*a*b* (also referred to as a CIELAB) color space, thereby to generate another converted image. The L*a*b* color space includes three channels: perceptual lightness (L*), relative green-red (a*), and relative blue-yellow (b*). The L* parameter is expressed s a number from 0 to 100, and the a* and b* are unbounded with negative numbers indicating more green or more blue colors, respectively, and positive numbers indicating more red or more yellow colors, respectively. In some implementations, a* and b* may be bounded, for example for practical or computational reasons. The parameters may require definition relative to a standard illuminant (i.e., a reference white value), such as CIE Standard Illuminants D50 or D65. Operation 433A may include an intermediate operation of converting from RGB to an XYZ (also referred to as a CIEXYZ) color space.

Next, at 434A the converted L*a*b* image is analyzed to determine a magnitude of the gradient across each channel of the whole image. The gradient refers to the change in each channel value from pixel to pixel and may correspond to the rate of increase/decrease in luminosity and the rate of color change across pixels. As such, the gradient may provide information regarding sharp edges or changes in the input image. At operation 435A, the magnitude of the gradient within the temporarily-identified pixel regions is compared to a threshold for both the mean and the standard deviation (SD) across each channel. Regions (or portions of the temporarily identified regions) where the threshold condition is satisfied (e.g., the mean and standard deviation exceed respective threshold values) for all three channels may be considered as "target-texture" pixel regions. For the target-texture pixel regions, the temporary identification may be converted to a permanent identification (e.g., identified until operation 440A or operation 460A are completed). For temporarily-identified regions which are not considered target-texture pixel regions, the temporary identification may be cleared so as to discard the regions. Pixels which are both target-color pixels and target-texture pixels may be considered target pixels, or as pixels which are indicative of a certain species of bacteria.

After operations 420A and 430A (or, in implementations where only one thresholding is performed, after operation 420A or operation 430A), at operation 440A an operation of removing small areas may be performed. Operation 440a may include comparing the size of each identified area to a size threshold (which may be in terms of two-dimensional area and/or number of contiguous pixels), and discarding identified areas of the converted image which have a size that is smaller than the size threshold. Such small areas would be below a minimum acceptable area for indicating bacterial infection.

At operation 450A, contours are drawn (e.g., as a separate image or on the input image itself) based on the results of operations 420A and/or 430A to outline areas of bacteria. Thereby, an "overlay image" may refer to the overlay itself as an element that is shown, stored, etc. separate from the input image itself, such that no modifications are made to the input image. Operation 450A may be performed on the entirety of the input image, or only on a portion of the input image. For example, contours may be drawn only on a central area of the input image (e.g., within a predetermined rectangular or otherwise-shaped area) to mitigate color discrepancies when detecting thresholds between the center and the edges of the image. Operation 450A may include drawing a boundary of the central area on the input image. In some implementations, the contours drawn in operation 450A may be drawn in color, such as a color corresponding to the target bacterial species or any other color. In some implementations, the contours drawn in operation 450A may be appended with a label (e.g., labeled with the color and/or labeled with the name of the bacterial species). In other implementations, the contours may filled in with color or may be replaced by other forms of highlighting the relevant areas (e.g., with a partially-transparent color overlay, with cross-hatching, etc.), with arrows or other pointers or indicating icons. In some implementations, the areas of bacteria may be identified by overlaying contours on an image other than the input image (e.g., on a white-light image corresponding to the input fluorescence image). At operation 460A, the overlay image is output (e.g., displayed to an operator, stored in memory, transmitted to another device, etc.). Relative to image capture, the overlay image output may be performed in real-time (e.g., displayed as a live view or preview on the same device which captures the image) or near real-time (e.g., within 0.5 seconds).

Figure 4B:
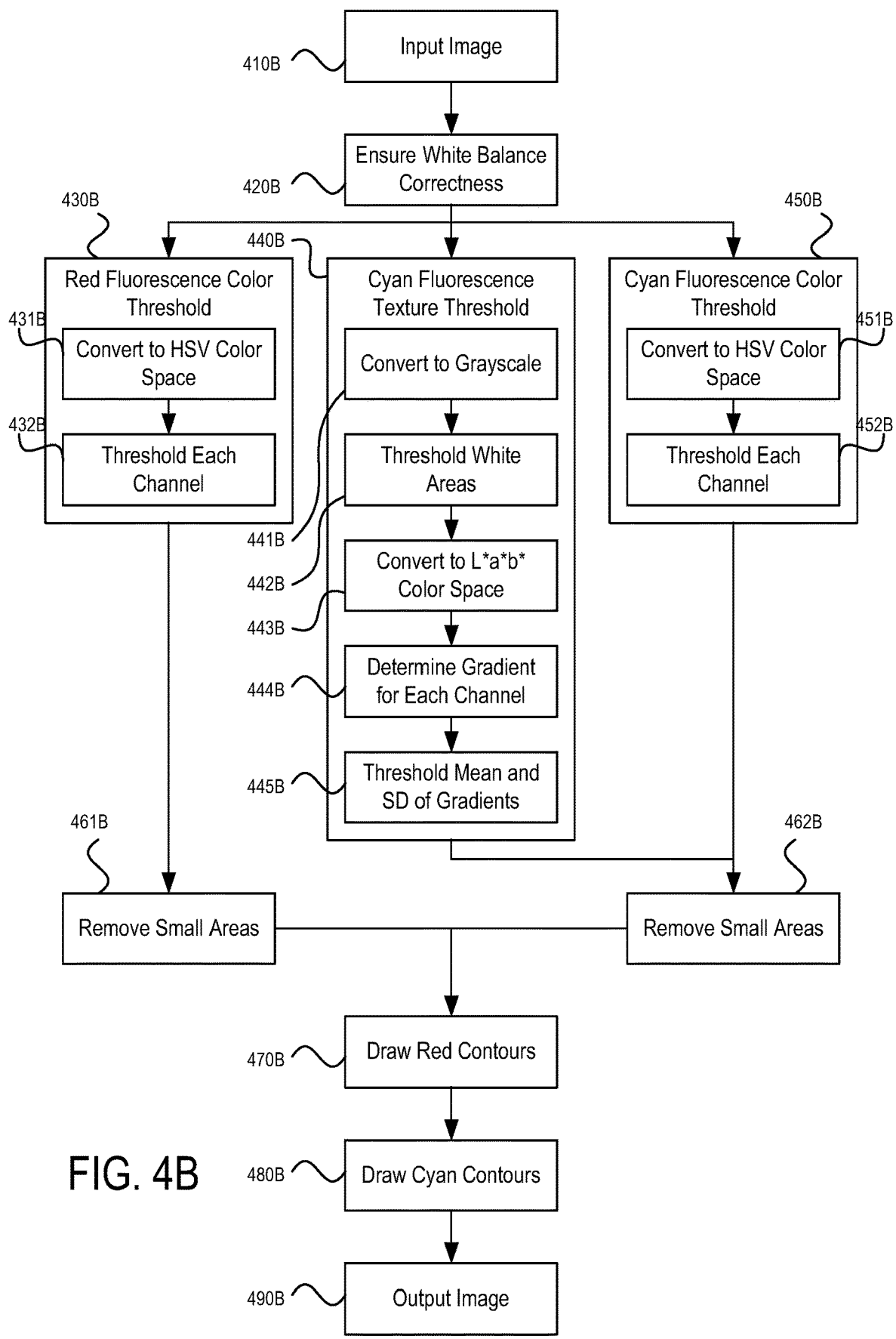

Another example of operations in accordance with the present disclosure is illustrated in FIG. 4B. The operations include, at 410B, receiving an input image. The input image may be a still image retrieved from a memory or captured by an image sensor, a video image retrieved from a memory and/or captured by the image sensor, and/or a real-time video stream from the image sensor. The input image may be a fluorescence image that captured the response of a target area (e.g., a wound) exposed to an excitation light. The operations include, at 420B, verifying or otherwise ensuring a white balance correctness of the input image. Operation 420B may include determining whether a white balance correction (e.g., an autocorrection by the image sensor) has been applied to the input image. The determination may be based on metadata included with the input image and/or information associated with the image capture device itself. If the white balance correction has been applied, operation 420 may include reversing the correction to mitigate variance from image to image. If the white balance correction has not been applied, operation 420B may include no further action. In this manner, operation 420B sets each input image to the same color temperature and tint based on temperature and tint values recorded upon image capture.

After the white balance correctness has been verified, one to three (or more) thresholding operations are performed: operation 430B of performing a red fluorescence color thresholding, operation 440B of performing a cyan fluorescence texture thresholding, and operation 450B of performing a cyan fluorescence color thresholding. Operations 430B, 440B, and 450B may be performed in any order, and certain sub-operations (e.g., operations 431B and 451B and/or operations 461B and 462B, which will be described in more detail below) may be combined. Moreover, in some implementations only red operations (i.e., operation 430B) may be performed, while in other implementations only cyan operations (i.e., operations 440B and 450B) may be performed. While FIG. 4B illustrates operations 440B and 450B being performed in parallel, in practice operations 440B and 450B may be performed in series in either order. Additionally or alternatively, these same processes may be performed for other colors in addition to red and cyan. It is also possible to perform the texture thresholding for red fluorescence, other fluorescence, and/or white light.

Operation 430B includes an operation 431B of converting the input image (which may be captured in, for example, an RGB color space) to an HSV color space, thereby generating a converted image. The HSV color space includes three channels: hue (H), saturation (S), and value (V). The H parameter is expressed in degrees from 0° to 360°, and the S and V parameters are expressed as percentages from 0% to 100%. To convert from RGB color space to HSV color space, for example, a conversion algorithm may be applied to the input image on a pixel-by-pixel basis. This conversion algorithm may include normalizing each of the R, G, and B pixel values to 1; calculating hue using a formula that is dependent on whether the normalized R, G, or B parameter is largest; calculating saturation based on the difference between the largest normalized R, G, and B parameter and the smallest and based on the value of the largest normalized R, G, and B parameter; and calculating value based on the largest normalized R, G, and B parameter. For example, a pixel having a pure cyan color would be converted from an (R, G, B) triplet of (0, 255, 255) to an (H, S, V) triplet of (180°, 100%, 100%); whereas a pixel having a pure red color would be converted from an (R, G, B) triplet of (255, 0, 0) to an (H, S, V) triplet of (0°, 100%, 100%).

Operation 430B includes operation 432B of comparing each of the H, S, and V channels of the converted image to a threshold condition. Pixels which satisfy the threshold condition for each of the channels may be identified as candidate pixel. In the example below, pixels which may not be "true" red pixels are eliminated by thresholding. This may be done, for example, to identify pixels that correspond to bacteria having a certain concentration or to limit to pixels that correspond to a particular species of bacteria. The thresholding operation may be performed for all pixels for each channel in succession (i.e., all pixels for H, all pixels for S, and then all pixels for V) or for all channels for each pixel in succession (i.e., H, S, and V for the upper-left pixel, followed by H, S, and V for the right-adjacent pixel, and so on). In one example of operation 432B, the hue threshold condition may be that pixels having an H parameter of less than 20° or greater than 340° are considered "red-candidate" pixels; the saturation threshold condition may be that pixels having an S parameter of greater than 75% are considered "red-candidate" pixels; and the value threshold condition may be that pixels having a V parameter of greater than 75% are considered "red-candidate" pixels. Operation 432B may also include identifying (e.g., by appending or updating a data flag) areas of the converted image (or the original fluorescence image) where each channel satisfies the corresponding threshold condition. Thus, pixels which are red-candidate in each of the three channels may be considered "red-color" pixels or pixels having a color that has red as a dominant hue.

After operation 430B, at 461B an operation of removing small areas may be performed. Operation 461B may include comparing the size of each identified area to a size threshold (which may be in terms of two-dimensional area and/or number of contiguous pixels), and discarding identified areas of the converted image which have a size that is smaller than the size threshold. Such small areas would be below a minimum acceptable area for indicating bacterial infection.

Operation 440B includes an operation 441B of converting the input image to grayscale, thereby generating a converted image. To convert from RGB color space to grayscale, for example, a conversion algorithm may be applied to the input image on a pixel-by-pixel basis. This conversion algorithm may include determining a simple average of the R, G, and B components, a weighted average of the R, G, and B, components, and so on. The converted grayscale image may thus represent a luminosity or intensity of the input image without regard to color. After operation 441B, at 442B the converted grayscale image may be compared to an intensity threshold on a pixel-by-pixel basis; therefore, operations 441B and 442B may correspond to determining the brightest or most luminous portions of the input image. Those pixels which correspond to an intensity greater than the intensity threshold may be temporarily identified (e.g., identified until operation 440B has concluded) as "cyan-candidate" pixels. In some implementations, all pixels within a predetermined number of the temporarily-identified pixels may be temporarily identified as well, thereby to generate "cyan-candidate" pixel regions.

At operation 443B, the input image is converted to a L*a*b* color space, thereby to generate another converted image. The L*a*b* color space includes three channels: perceptual lightness (L*), relative green-red (a*), and relative blue-yellow (b*). The L* parameter is expressed s a number from 0 to 100, and the a* and b* are unbounded with negative numbers indicating more green or more blue colors, respectively, and positive numbers indicating more red or more yellow colors, respectively. In some implementations, a* and b* may be bounded, for example for practical or computational reasons. The parameters may require definition relative to a standard illuminant (i.e., a reference white value), such as CIE Standard Illuminants D50 or D65. Operation 443B may include an intermediate operation of converting from RGB to an XYZ color space. For example, a pixel having a pure cyan color would be converted from an (R, G, B) triplet of (0, 255, 255) to an (L*, a*, b*) triplet of (91.12, −48.08, −14.14) directly, or with an intermediate conversion to an (X, Y, Z) triplet of (53.81, 78.74, and 106.97).

Next, at 444B the converted L*a*b* image is analyzed to determine a magnitude of the gradient across each channel of the whole image. The gradient refers to the change in each channel value from pixel to pixel and may correspond to the rate of increase/decrease in luminosity and the rate of color change across pixels. As such, the gradient may provide information regarding sharp edges or changes in the input image. At operation 445B, the magnitude of the gradient within the temporarily-identified pixel regions is compared to a threshold for both the mean and the SD across each channel. Regions (or portions of the temporarily identified regions) where the threshold condition is satisfied (e.g., the mean and standard deviation exceed respective threshold values) for all three channels may be considered as "cyan-texture" pixel regions. For the cyan-texture pixel regions, the temporary identification may be converted to a permanent identification (e.g., identified until operation 462B or operation 480B are completed). For temporarily-identified regions which are not considered cyan-texture pixel regions, the temporary identification may be cleared so as to discard the regions.

Operation 450B includes an operation 451B of converting the input image to an HSV color space. In implementations where both operations 430B and 450B are performed, operations 431B and 451B may be combined to avoid unnecessary repetition. Operation 450 includes operation 452B of comparing each of the H, S, and V channels of the converted image to a threshold condition. Pixels which satisfy the threshold condition for each of the channels may be identified as candidate pixel. In the example below, pixels which may not be "true" cyan pixels are eliminated by thresholding. This may be done, for example, to identify pixels that correspond to bacteria having a certain concentration or to limit to pixels that correspond to a particular species of bacteria. The thresholding operation may be performed for all pixels for each channel in succession (i.e., all pixels for H, all pixels for S, and then all pixels for V) or for all channels for each pixel in succession (i.e., H, S, and V for the upper-left pixel, followed by H, S, and V for the right-adjacent pixel, and so on). In one example of operation 432B, the hue threshold condition may be that pixels having an H parameter of between 160° and 200° are considered "cyan-candidate" pixels; the saturation threshold condition may be that pixels having an S parameter of greater than 75% are considered "cyan-candidate" pixels; and the value threshold condition may be that pixels having a V parameter of greater than 75% are considered "cyan-candidate" pixels. Operation 452B may also include identifying areas of the converted image (or the original fluorescence image) where each channel satisfies the corresponding threshold condition. Thus, pixels which are cyan-candidate in each of the three channels may be considered "cyan-color" pixels. In some implementations, the operation 452B may be performed only on those regions which were permanently identified in operation 445B; conversely, in some implementations where the order of operations 440B and 450B are reversed), operation 445B may be performed only on those regions which were identified in operation 452B. In other implementations, both operations 445B and 452B may be performed separately and their results added together or combined. Thus, pixels which are both cyan-color pixels and cyan-texture pixels may be considered "cyan" pixels or as pixels which are indicative of a certain species of bacteria.

After operations 440B and 450B, at 462B another operation of removing small areas may be performed. Operation 462B may include comparing the size of each identified area to a size threshold (which may be in terms of two-dimensional area and/or number of contiguous pixels), and discarding identified areas of the converted image which have a size that is smaller than the size threshold. Such small areas would be below a minimum acceptable area for indicating bacterial infection. In implementations where operations 430B, 440B, and 450B are performed, operations 461B and 462B may be combined to avoid unnecessary repetition.

At operation 470B, red contours are drawn on the input image based on the results of operations 430B and 461B. At operation 480B, cyan contours are drawn on the input image based on the results of operations 440B, 450B, and 462B. Thereby, an overlay image may be generated. In implementations where operation 430B is performed but not operations 440B or 450B, operation 480B may be omitted or skipped. Similarly, in implementations where operations 440B and 450B are performed but not operation 430B, operation 470B may be omitted or skipped. Operations 470B and/or 480B may be performed on the entirety of the input image, or only on a portion of the input image. For example, contours may be drawn only on a central area of the input image (e.g., within a predetermined rectangular or otherwise-shaped area) to mitigate color discrepancies when detecting thresholds between the center and the edges of the image. Operations 470B and/or 480B may include drawing a boundary of the central area on the input image. In some implementations, the contours drawn in operation 470B and the contours drawn in operation 480B may be drawn using different colors. For example, the contours drawn in operation 470B may be drawn in red, and the contours drawn in operation 480B may be drawn in cyan. In other implementations (e.g., a color-blind mode), the contours drawn in operations 470B and 480B may be drawn in the same color and appended with a label (e.g., labeled "red" and "cyan" and/or labeled with the name of bacterial species). In other implementations, the contours may filled in with color or may be replaced by other forms of highlighting the relevant areas (e.g., with a partially-transparent color overlay, with cross-hatching, etc.), with arrows or other pointers or indicating icons. At operation 490B, the overlay image is output (e.g., displayed to an operator, stored in memory, transmitted to another device, etc.). Relative to image capture, the overlay image output may be performed substantially in real-time (e.g., displayed as a live view or preview on the same device which captures the image) or near real-time (e.g., within 0.5 seconds).

The above operations of FIG. 4B include exemplary operations in particular color spaces (e.g., RGB for image capture, HSV for color analysis conversion, and L*a*b* for textural analysis conversion); however, these color spaces are merely exemplary and not limiting. As noted above with regard to FIG. 3, any of the operations may take place in any desired color space, including but not limited to HSV, HSL, CIEXYZ, CIELUV, L*a*b*, RGB, YCbCr, YUV, LCh, CMY, CMYK, and custom color spaces. Thus, certain conversion operations shown in FIG. 4B (e.g., zero, one, or more of operations 431B, 441B, 443B, and 451B) may be combined with one another or, if the image already exists in the target color space, omitted entirely.

Figure 5B:
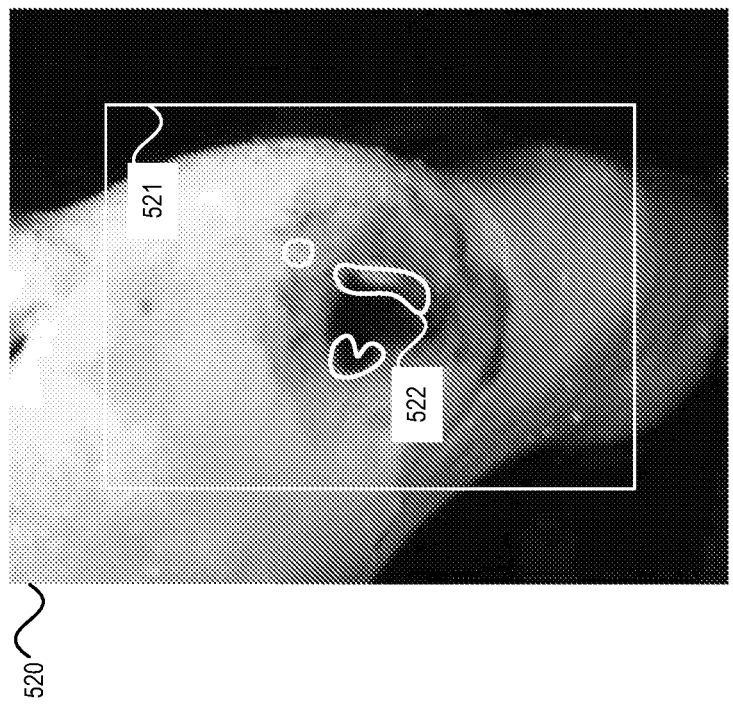
FIGS. 5A-6B illustrate exemplary images accordance with various aspects of the present disclosure.
Figure 5A:
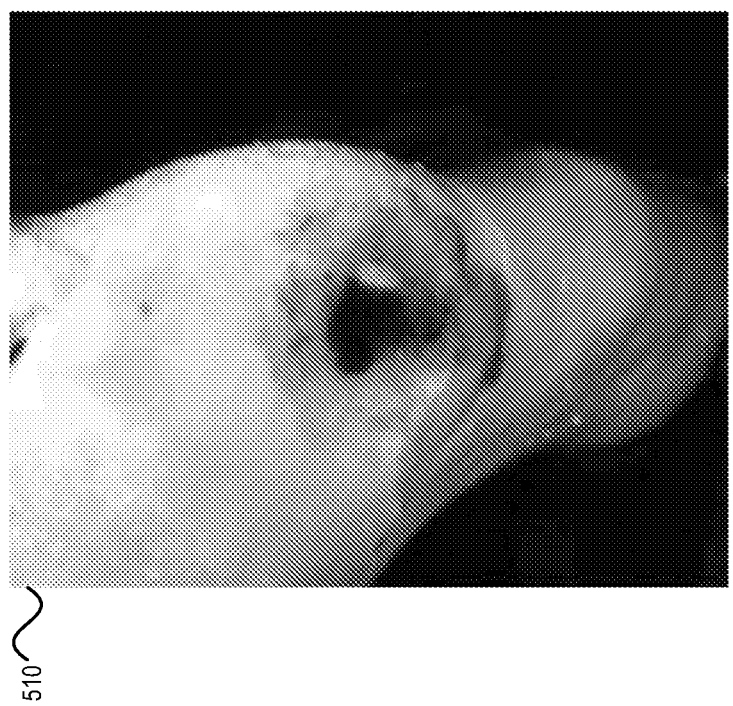
Figure 6B:
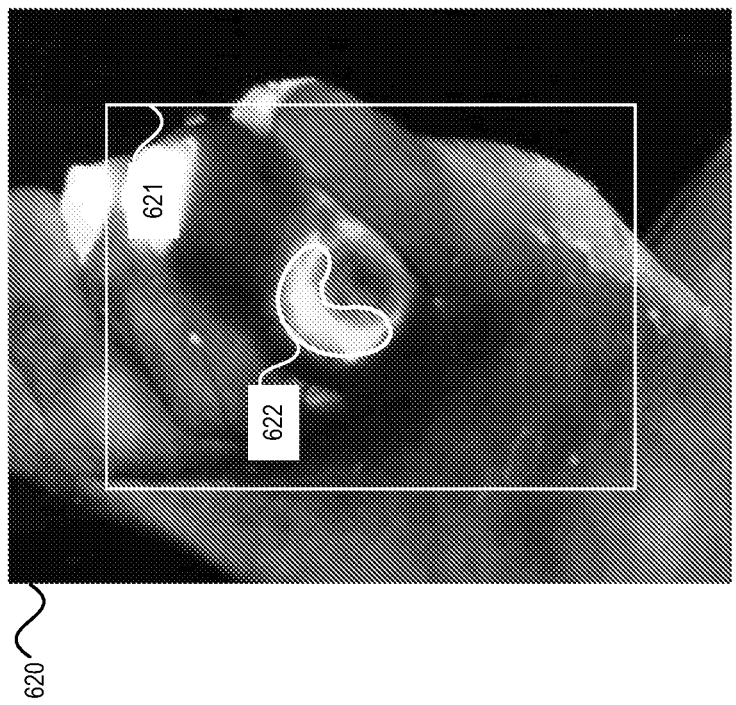
Figure 6A:

FIGS. 5A-5B illustrate exemplary images input into or resulting from the operations of FIG. 4B. FIG. 5A shows an input fluorescence image 510 which includes areas of red. FIG. 5B shows a corresponding overlay image 520 which includes a boundary of the central area 521 and contours 522 highlighting the areas of red as determined by operations of, for example, FIG. 4B. FIG. 5B may be the result of only the red operations of FIG. 4B (e.g., the path including operation 430B) or may be the result of both the red and cyan operations being performed on an input image having no cyan areas. FIG. 6A shows an input fluorescence image 610 which includes areas of cyan. FIG. 6B shows a corresponding overlay image 620 which includes a boundary of the central area 621 and contours 622 highlighting the areas of cyan as determined by operations of, for example, FIG. 4B. FIG. 6B may be the result of only the cyan operations of FIG. 4B (e.g., the path including operations 440B and 450B) or may be the result of both the red and cyan operations being performed on an input image having no red areas. In other examples not expressly illustrated, an overlay image may include contours corresponding to red areas simultaneous with contours corresponding to cyan areas.

The systems, devices, and methods described above thus may provide information to accurately, reliably, and/or easily identify potential areas of interest (e.g., bacterial infections) in fluorescence images, thereby improving treatment and reducing errors.

The exemplary systems, devices, and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

Illustrative examples of systems, methods, and devices described herein are provided below. An embodiment of a system, method, and/or device described herein may include any one or more, and any combination of, the clauses described below:

Clause 1. A portable, hand-held device, comprising: an imaging device configured to receive a fluorescence image; a memory; and a processor configured to: perform a color analysis of the fluorescence image, including: converting the fluorescence image to an HSV color space to generate a first converted image, for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature, for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the value parameter satisfies the first value threshold condition, discard the identified areas which are smaller than a size threshold, and outline the remaining identified areas on the fluorescence image to generate an overlay image.

Clause 2. The device according to clause 1, wherein the color analysis further includes: for a second range of the hue parameter of the first converted image, comparing the saturation parameter of the first converted image to a second saturation threshold condition, wherein the second saturation threshold condition is based on a correlation between a second color corresponding to the second range of the hue parameter and a second bacterial fluorescence signature, for the second range of the hue parameter, comparing the value parameter of the first converted image to a second value threshold condition, wherein the second value threshold condition is based on the correlation between the second color and the second bacterial fluorescence signature, and for the second range of the hue parameter, identifying areas of the fluorescence image where the saturation parameter satisfies the second saturation threshold condition and the value parameter satisfies the second value threshold condition.

Clause 3. The device according to clause 3, wherein the first color is cyan and the second color is red or a color that has red as a dominant hue.

Clause 4. The device according to any one of clauses 1 to 3, wherein the processor is configured to: perform a textural analysis of the fluorescence image, including: converting the fluorescence image to grayscale, thereby to generate a second converted image, comparing, on a pixel-by-pixel basis, an intensity parameter of the second converted image to an intensity threshold, temporarily identifying regions within a predetermined pixel distance of pixels in which the intensity parameter exceeds the intensity threshold, converting the fluorescence image to a L*a*b* color space, thereby to generate a third converted image, within each channel of the third converted image, determine a respective gradient of the temporarily identified regions, and permanently identifying those ones of the temporarily identified regions in which the respective gradient for each channel of the third converted image exceeds a gradient threshold.

Clause 5. The device according to any one of clauses 1 to 4, wherein the first bacterial fluorescence signature corresponds to a bacterial concentration of $10^4$ cfu/g or higher.

Clause 6. The device according to any one of clauses 1 to 5, wherein the first bacterial fluorescence signature corresponds to at least one of *Pseudomonas aeruginosa, Escherichia coli, Proteus mirabilis, Proteus vulgaris, Enterobacter cloacae, Serratia marcescens, Acinetobacter baumannii, Klebsiella pneumoniae, Klebsiella oxytoca, Morganella morganii, Stenotrophomonas maltophilia, Citrobacter koseri, Citrobacter freundii, Aeromonas hydrophilia, Alcaligenes faecalis, Pseudomonas putida, Staphylococcus aureus, Staphylococcus epidermis, Staphylococcus lugdunensis, Staphylococcus capitis, Corynebacterium striatum, Bacillus cereus, Listeria monocytogenes, Bacteroides fragilis, Clostridium perfringens, Peptostreptococcus anaerobius, Propionibacterium acnes*, and/or *Veillonella parvula*.

Clause 7. The device according to any one of clauses 1 to 6, further comprising an excitation light source configured to illuminate a target with excitation light.

Clause 8. The device according to clause 7, wherein the excitation light includes a wavelength between 400 and 450 nm.

Clause 9. The device according to any one of clauses 1 to 8, wherein the imaging device includes a first image sensor configured to detect wavelengths between 500 and 550 nm.

Clause 10. The device according to any one of clauses 1 to 9, wherein the imaging device includes a second image sensor configured to detect wavelengths between 600 and 660 nm.

Clause 11. The device according to any one of clauses 1 to 10, further comprising a display device configured to output the fluorescence image and/or the overlay image.

Clause 12. The device according to clause 11, wherein the display device is configured to output the overlay image in real-time or near real-time.

Clause 13. The device according to any one of clauses 1 to 12, wherein the processor is configured to ensure a white balance correctness of the fluorescence image.

Clause 14. The device according to clause 13, wherein ensuring the white balance correctness includes determining whether a previous white balance correction has been applied based on metadata included in the fluorescence image.

Clause 15. The device according to clause 13 or 14, comprising performing a correction reversing operation.

Clause 16. A system, comprising: a display device; an imaging device including an excitation light source configured to irradiate a target area with excitation light, and an image sensor configured to capture a fluorescence image corresponding to a response of the target area to the excitation light; a housing; and circuitry disposed within the housing, including a processor configured to: perform a color analysis of the fluorescence image, including: converting the fluorescence image to an HSV color space, thereby to generate a first converted image, for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature, for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the value parameter satisfies the first value threshold condition, discard the identified areas which are smaller than a size threshold, and outline the remaining identified areas on the fluorescence image, thereby to generate an overlay image.

Clause 17. A fluorescence image interpretation method, comprising: receiving a fluorescence image; performing a color analysis of the fluorescence image, including: converting the fluorescence image to an HSV color space, thereby to generate a first converted image, for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature, for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the value parameter satisfies the first value threshold condition; discarding the identified areas which are smaller than a size threshold; and outlining the remaining identified areas on the fluorescence image, thereby to generate an overlay image.

Clause 18. A portable, hand-held device, comprising: an imaging device configured to receive a fluorescence image; a memory; and a processor configured to perform a textural analysis of the fluorescence image, including: converting the fluorescence image to grayscale, thereby to generate a first converted image, comparing, on a pixel-by-pixel basis, an intensity parameter of the first converted image to an intensity threshold, temporarily identifying regions within a predetermined pixel distance of pixels in which the intensity parameter exceeds the intensity threshold, converting the fluorescence image to a predetermined color space, thereby to generate a second converted image, within each channel of the second converted image, determine a respective gradient of the temporarily identified regions, and permanently identifying those ones of the temporarily identified regions in which the respective gradient for each channel of the second converted image exceeds a gradient threshold.

Clause 19. The device according to clause 18, wherein the predetermined color space is an HSV color space, a CIEXYZ color space, a CIELUV color space, an RGB color space, a YCbCr color space, a YUV color space, an LCh color space, an L*a*b* color space, a CMY color space, a CMYK color space, or a custom color space.

Clause 20. The device according to clause 18, wherein the predetermined color space is an L*a*b* color space.

Clause 21. A method of interpreting a clinical image, comprising: on a handheld imaging device, receiving an input image; performing a color analysis and/or a textural analysis on the input image to identify areas of clinical interest in the input image; generating an overlay, wherein the overlay includes one or more colors, highlights, arrows or other manner of highlighting which, when positioned over the input image, provide an indication of one or more clinical features of interest; and displaying, in real-time, an output image comprising the input image and the overlay, wherein clinical features of interest on the input image are highlighted for a user of the imaging device by the overlay.

Clause 22. The method of clause 21, wherein receiving an input image comprises receiving a fluorescent image of a wound.

Clause 23. The method of clause 21 or 22, wherein performing a color analysis and/or a textural analysis on the input image to identify areas of clinical interest in the input image comprises performing a color analysis to identify locations of a color corresponding to a clinical feature present in the input image.

Clause 24. The method of clause 23, wherein performing a color analysis to identify locations of a color corresponding to a clinical feature present in the input image includes identifying areas in the input image in which the color corresponding to the clinical feature exceeds a threshold amount.

Clause 25. The method of clause 24, wherein the threshold amount corresponds to bacterial concentration equal to or greater than $10^4$ cfu/g.

Clause 26. The method of clause 24, wherein the threshold amount corresponds to one or more of a presence, a location, or an abundance of a specific bacterial species.

Clause 27. The method of clause 21 or 22, wherein performing a color analysis and/or a textural analysis on the input image to identify areas of clinical interest in the input image comprises performing a textural analysis to identify locations not of clinical interest in the input image.

Clause 28. The method of any one of clauses 21-27, wherein displaying, in real-time, an output image comprising the input image and the overlay includes displaying the output image on a touchscreen display of the handheld imaging device.

Clause 29. The method of clause 28, further comprising toggling between displaying the input image and the output image on the display of the handheld imaging device.

Clause 30. A portable, hand-held device, comprising: an imaging device configured to receive an input image; a memory; and a processor configured to: perform a color analysis of the input image, including: convert the input image to a predetermined color space which includes a first channel corresponding to a first parameter, a second channel corresponding to a second parameter, and a third channel corresponding to a third parameter, thereby to generate a converted image, for a first range of the first parameter of the converted image, comparing the second parameter of the first converted image to a threshold condition, wherein the first threshold condition is based on a correlation between the first range of the first parameter and a bacterial signature, for the first range of the first parameter, comparing the third parameter of the converted image to a second threshold condition, wherein the second threshold condition is based on the correlation between the first range of the first parameter and the bacterial signature, and for the first range of the first parameter, identifying areas of the input image where the second parameter satisfies the first threshold condition and the third parameter satisfies the second threshold condition, discard the identified areas which are smaller than a size threshold, and outline the remaining identified areas of the input image, thereby to generate an overlay image.

Clause 31. The device according to clause 30, wherein the predetermined color space is an HSV color space, a CIEXYZ color space, a CIELUV color space, an RGB color space, a YCbCr color space, a YUV color space, an LCh color space, an L*a*b* color space, a CMY color space, a CMYK color space, or a custom color space.

Clause 32. The device according to clause 30, wherein the predetermined color space is an HSV color space.

Clause 33. The device according to clause 30, wherein the processor is further configured to fill the outlined areas with a predetermined color.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:
1. A portable, hand-held device, comprising:
an imaging device configured to receive a fluorescence image;
a memory; and
a processor configured to:
  perform a color analysis of the fluorescence image, including:
    converting the fluorescence image to a hue-saturation-value (HSV) color space to generate a first converted image,
    for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature,
for the first range of the hue parameter, comparing a value parameter of the first converted image to a first value threshold condition, wherein the first value threshold condition is based on the correlation between the first color and the first bacterial fluorescence signature, and
for the first range of the hue parameter, identifying areas of the fluorescence image where the saturation parameter satisfies the first saturation threshold condition and the value parameter satisfies the first value threshold condition,
discard the identified areas which are smaller than a size threshold, and
outline the remaining identified areas on the fluorescence image to generate an overlay image.

2. The device according to claim 1, wherein the color analysis further includes:
for a second range of the hue parameter of the first converted image, comparing the saturation parameter of the first converted image to a second saturation threshold condition, wherein the second saturation threshold condition is based on a correlation between a second color corresponding to the second range of the hue parameter and a second bacterial fluorescence signature,
for the second range of the hue parameter, comparing the value parameter of the first converted image to a second value threshold condition, wherein the second value threshold condition is based on the correlation between the second color and the second bacterial fluorescence signature, and
for the second range of the hue parameter, identifying areas of the fluorescence image where the saturation parameter satisfies the second saturation threshold condition and the value parameter satisfies the second value threshold condition.

3. The device according to claim 2, wherein the first color is cyan and the second color is red or a color that has red as a dominant hue.

4. The device according to claim 1, wherein the processor is configured to:
perform a textural analysis of the fluorescence image, including:
converting the fluorescence image to grayscale, thereby to generate a second converted image,
comparing, on a pixel-by-pixel basis, an intensity parameter of the second converted image to an intensity threshold,
temporarily identifying regions within a predetermined pixel distance of pixels in which the intensity parameter exceeds the intensity threshold,
converting the fluorescence image to a perceptual lightness/relative green-red/relative blue-yellow (L*a*b*) color space, thereby to generate a third converted image,
within each channel of the third converted image, determine a respective gradient of the temporarily identified regions, and
permanently identifying those ones of the temporarily identified regions in which the respective gradient for each channel of the third converted image exceeds a gradient threshold.

5. The device according to claim 1, wherein the first bacterial fluorescence signature corresponds to a bacterial concentration of $10^4$ cfu/g or higher.

6. The device according to claim 1, wherein the first bacterial fluorescence signature corresponds to at least one of *Pseudomonas aeruginosa, Escherichia coli, Proteus mirabilis, Proteus vulgaris, Enterobacter cloacae, Serratia marcescens, Acinetobacter baumannii, Klebsiella pneumoniae, Klebsiella oxytoca, Morganella morganii, Stenotrophomonas maltophilia, Citrobacter koseri, Citrobacter freundii, Aeromonas hydrophilia, Alcaligenes faecalis, Pseudomonas putida, Staphylococcus aureus, Staphylococcus epidermis, Staphylococcus lugdunensis, Staphylococcus capitis, Corynebacterium striatum, Bacillus cereus, Listeria monocytogenes, Bacteroides fragilis, Clostridium perfringens, Peptostreptococcus anaerobius, Propionibacterium acnes*, and/or *Veillonella parvula*.

7. The device according to claim 1, further comprising an excitation light source configured to illuminate a target with excitation light.

8. The device according to claim 7, wherein the excitation light includes a wavelength between 400 and 450 nm.

9. The device according to claim 1, wherein the imaging device includes a first image sensor configured to detect wavelengths between 500 and 550 nm.

10. The device according to claim 1, wherein the imaging device includes a second image sensor configured to detect wavelengths between 600 and 660 nm.

11. The device according to claim 1, further comprising a display device configured to output the fluorescence image and/or the overlay image.

12. The device according to claim 11, wherein the display device is configured to output the overlay image in real-time or near real-time.

13. The device according to claim 1, wherein the processor is configured to ensure a white balance correctness of the fluorescence image.

14. The device according to claim 13, wherein ensuring the white balance correctness includes determining whether a previous white balance correction has been applied based on metadata included in the fluorescence image.

15. The device according to claim 1, comprising performing a correction reversing operation.

16. A system, comprising:
a display device;
an imaging device including an excitation light source configured to irradiate a target area with excitation light, and an image sensor configured to capture a fluorescence image corresponding to a response of the target area to the excitation light;
a housing; and
circuitry disposed within the housing, including a processor configured to:
perform a color analysis of the fluorescence image, including:
converting the fluorescence image to a hue-saturation-value (HSV) color space, thereby to generate a first converted image,
for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature,
for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the value parameter satisfies the first value threshold condition, discard the identified areas which are smaller than a size threshold, and outline the remaining identified areas on the fluorescence image, thereby to generate an overlay image.

17. A fluorescence image interpretation method, comprising:

receiving a fluorescence image;

performing a color analysis of the fluorescence image, including:

converting the fluorescence image to a hue-saturation-value (HSV) color space, thereby to generate a first converted image, for a first range of a hue parameter of the first converted image, comparing a saturation parameter of the first converted image to a first saturation threshold condition, wherein the first saturation threshold condition is based on a correlation between a first color corresponding to the first range of the hue parameter and a first bacterial fluorescence signature, for the first range of the hue parameter, comparing a value parameter of the first converted image to a first value threshold condition, wherein the first value threshold condition is based on the correlation between the first color and the first bacterial fluorescence signature, and for the first range of the hue parameter, identifying areas of the fluorescence image where the saturation parameter satisfies the first saturation threshold condition and the value parameter satisfies the first value threshold condition;

discarding the identified areas which are smaller than a size threshold; and outlining the remaining identified areas on the fluorescence image, thereby to generate an overlay image.

18. A portable, hand-held device, comprising:

an imaging device configured to receive a fluorescence image;

a memory; and a processor configured to perform a textural analysis of the fluorescence image, including:

converting the fluorescence image to grayscale, thereby to generate a first converted image, comparing, on a pixel-by-pixel basis, an intensity parameter of the first converted image to an intensity threshold, temporarily identifying regions within a predetermined pixel distance of pixels in which the intensity parameter exceeds the intensity threshold, converting the fluorescence image to a predetermined color space, thereby to generate a second converted image, within each channel of the second converted image, determine a respective gradient of the temporarily identified regions, and permanently identifying those ones of the temporarily identified regions in which the respective gradient for each channel of the second converted image exceeds a gradient threshold.

19. The device according to claim 18, wherein the predetermined color space is a hue-saturation-value (HSV) color space, a red-green-blue (RGB) color space, or a custom color space.

20. The device according to claim 18, wherein the predetermined color space is a perceptual lightness/relative green-red/relative blue-yellow (L*a*b*) color space.

21. A method of interpreting a clinical image, comprising:

on a handheld imaging device, receiving an input image;

performing the textural analysis of claim 18 on the input image to identify areas of clinical interest in the input image;

generating an overlay, wherein the overlay includes one or more colors, highlights, arrows or other manner of highlighting which, when positioned over the input image, provide an indication of one or more clinical features of interest; and displaying, in real-time, an output image comprising the input image and the overlay, wherein clinical features of interest on the input image are highlighted for a user of the imaging device by the overlay.

22. The method of claim 21, wherein receiving an input image comprises receiving a fluorescent image of a wound.

23. The method of claim 21, wherein performing the textural analysis on the input image to identify areas of clinical interest in the input image comprises performing a color analysis to identify locations of a color corresponding to a clinical feature present in the input image.

24. The method of claim 23, wherein performing the color analysis to identify the locations of the color corresponding to the clinical feature present in the input image includes identifying areas in the input image in which the color corresponding to the clinical feature exceeds a threshold amount.

25. The method of claim 24, wherein the threshold amount corresponds to bacterial concentration equal to or greater than $10^4$ cfu/g.

26. The method of claim 24, wherein the threshold amount corresponds to one or more of a presence, a location, or an abundance of a specific bacterial species.

27. The method of claim 21, wherein performing the textural analysis on the input image to identify areas of clinical interest in the input image comprises performing a textural analysis to identify locations not of clinical interest in the input image.

28. The method of claim 21, wherein displaying, in real-time, an output image comprising the input image and the overlay includes displaying the output image on a touchscreen display of the handheld imaging device.

29. The method of claim 28, further comprising toggling between displaying the input image and the output image on the display of the handheld imaging device.

30. A portable, hand-held device, comprising:

an imaging device configured to receive an input image;

a memory; and a processor configured to:

perform a color analysis of the input image, including:

convert the input image to a predetermined color space which includes a first channel corresponding to a first parameter, a second channel corresponding to a second parameter, and a third channel corresponding to a third parameter, thereby to generate a converted image, for a first range of the first parameter of the converted image, comparing the second parameter of the first converted image to a first threshold condition, wherein the first threshold condition is based on a correlation between the first range of the first parameter and a bacterial signature, for the first range of the first parameter, comparing the third parameter of the converted image to a second threshold condition, wherein the second threshold condition is based on the correlation between the first range of the first parameter and the bacterial signature, and for the first range of the first parameter, identifying areas of the input image where the second parameter satisfies the first threshold condition and the third parameter satisfies the second threshold condition, discard the identified areas which are smaller than a size threshold, and outline the remaining identified areas of the input image, thereby to generate an overlay image.

31. The device according to claim 30, wherein the predetermined color space is a hue-saturation-value (HSV) color space, a a red-green-blue (RGB) color space, or a custom color space.

32. The device according to claim 30, wherein the predetermined color space is a hue-saturation-value (HSV) color space.

33. The device according to claim 30, wherein the processor is further configured to fill the outlined areas with a predetermined color.

* * * * *